R. SCHMITZ.
ROTARY VALVE FOR GAS ENGINES.
APPLICATION FILED OCT. 22, 1915.

1,281,423.

Patented Oct. 15, 1918.
3 SHEETS—SHEET 1.

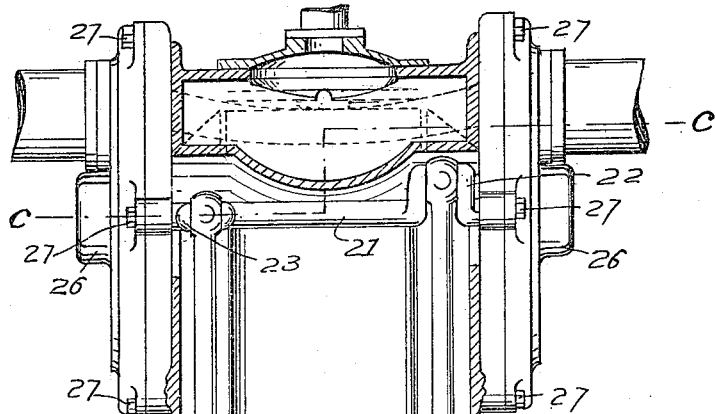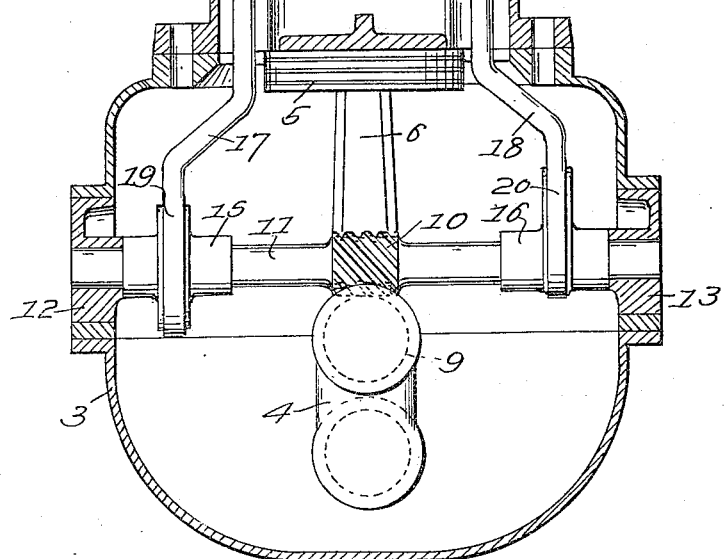

R. SCHMITZ.
ROTARY VALVE FOR GAS ENGINES.
APPLICATION FILED OCT. 22, 1915.
1,281,423.
Patented Oct. 15, 1918.
3 SHEETS—SHEET 3.
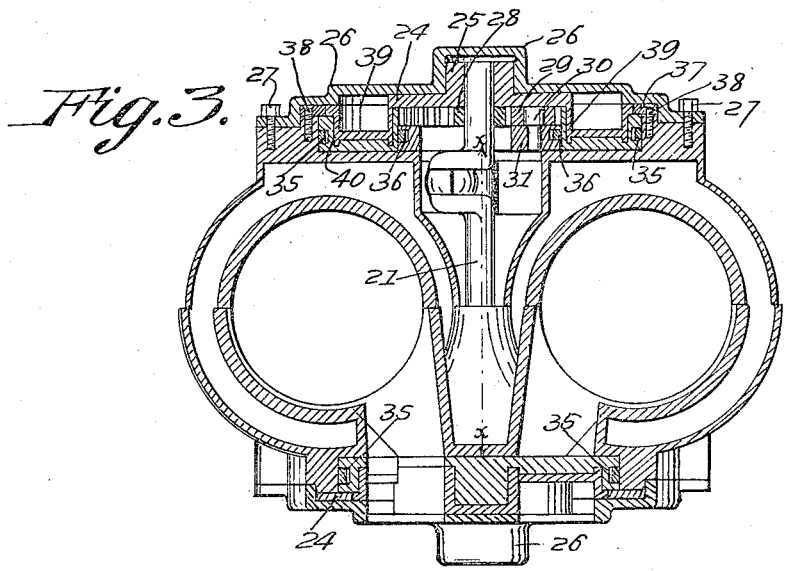
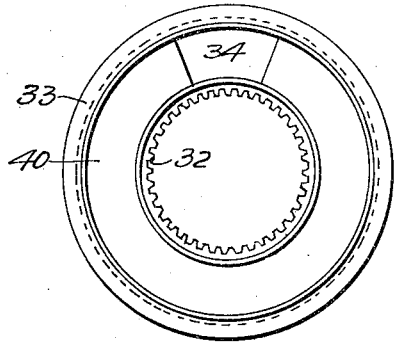
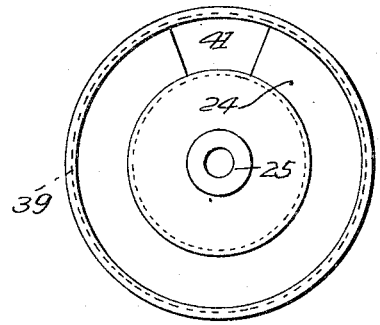
Inventor
Richard Schmitz
by Harry Lea Dodson
Attorney

UNITED STATES PATENT OFFICE.

RICHARD SCHMITZ, OF CHICAGO, ILLINOIS, ASSIGNOR TO SCHMITZ ENGINE COMPANY, A CORPORATION OF SOUTH DAKOTA.

ROTARY VALVE FOR GAS-ENGINES.

1,281,423.   Specification of Letters Patent.   Patented Oct. 15, 1918.

Application filed October 22, 1915.   Serial No. 57,323.

*To all whom it may concern:*

Be it known that I, RICHARD SCHMITZ, a citizen of the United States, residing at Chicago, in the county of Cook and State of Illinois, have invented a certain new and useful Improvement in Rotary Valves for Gas-Engines, of which the following is a specification.

My invention relates to that class of engines which are designed to do away with puppet valves with their many objectionable features and substitute in the place thereof a noiseless rotary valve, and to provide a construction which will permit a single valve to perform the necessary function for two cylinders, and has for its further object to provide for the inlet ports to be on one side of the cylinder and the exhaust ports on the other, and to cause the same mechanism which rotates the one valve to rotate the other. My invention has for its further object to provide for a quick opening and closing of the valves and to provide a construction which will relieve the valve from the necessity of a pressure plate with the difficulties which are present where one is employed.

My means of accomplishing the foregoing objects may be more readily understood by having reference to the accompanying drawings, which are hereunto annexed and are a part of this specification, in which:

Fig. 2 is a vertical sectional view on the line $x$—$x$ in Fig. 3, a portion of the valve structure being shown in elevation.

Fig. 3 is a horizontal cross section, the upper half being on line $a$—$a$ in Fig. 1, the lower half on line $b$—$b$ in Fig. 1, or the view may be considered as taken on line $c$—$c$ in Fig. 2.

Fig. 4 is a detail view showing the inner valve disk.

Fig. 5 is a detail view showing the outer valve disk.

Similar reference numerals refer to similar parts throughout the entire description.

Figure 1:
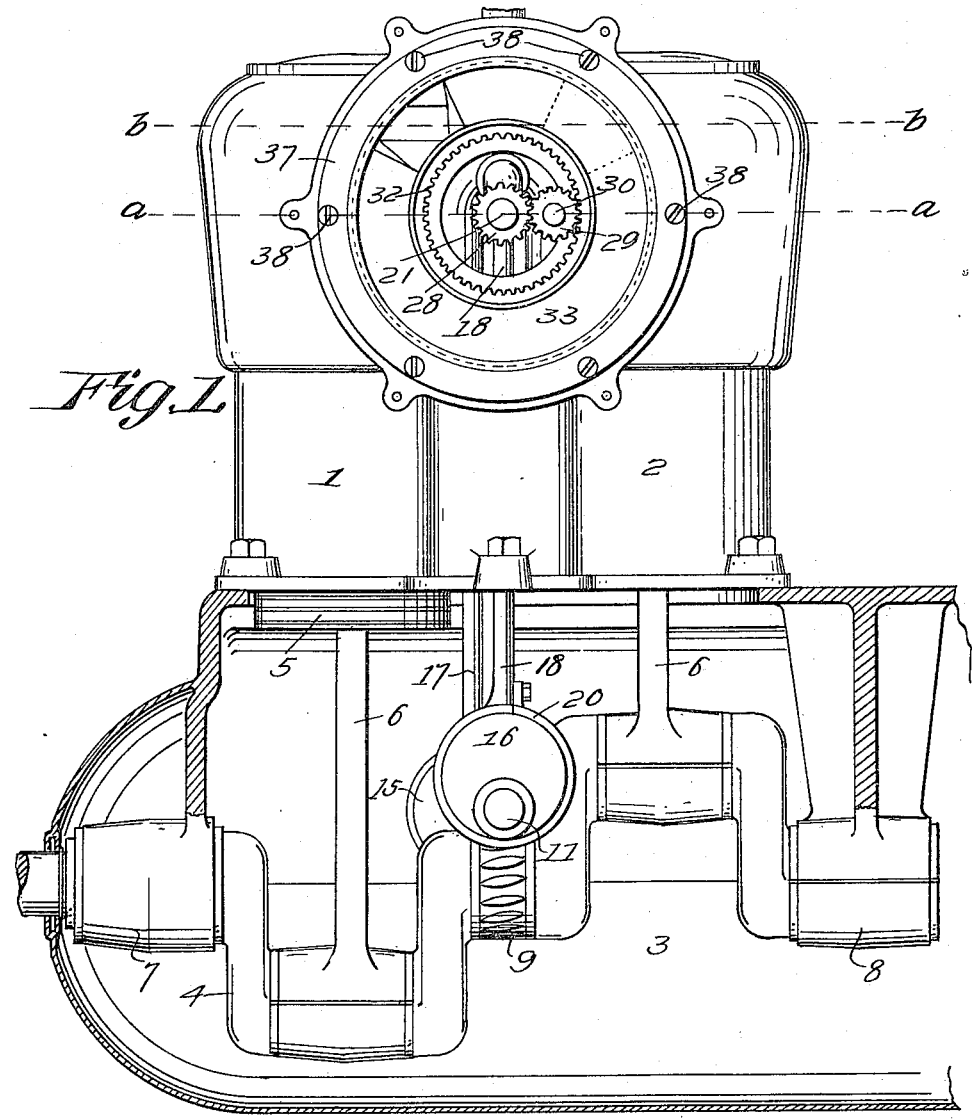
Figure 1 is a side elevation of an engine provided with my improved valve, part of it being shown in section, the plate and outer valve disk being removed to show the valve proper.

As shown in the drawings, the engine is provided with cylinders 1 and 2, which are provided with inlet ports on one side and exhaust ports on the opposite side, and a crank case 3, a crank 4 and piston 5. 6 indicates the connecting rods, the crank being carried in bearings 7 and 8. In the center of the crank is mounted a worm wheel or gear 9, which engages a worm 10 mounted upon the lower valve shaft 11, which is carried in bearings 12 and 13 formed in the side walls of the crank case 3. 15 and 16 indicate eccentrics which are engaged by eccentric rods 17 and 18, the latter being provided with straps 19 and 20 at their lower ends, which are fitted to the eccentrics 15 and 16. The upper ends of the eccentric rods 17 and 18 are secured to cranks 22 and 23 formed on the upper valve rod 21. This upper valve rod has mounted upon its outer ends disk valves 24, which are provided with outwardly extending hubs 25, and are journaled in valve covers 26, which are secured to the side walls of the cylinders by bolts 27, or in any other convenient manner.

The valve rod 21 also has fixedly secured to it adjacent each end a gear 28, which is adapted to engage a pinion 29 mounted upon a shaft 30, which is journaled in a lug 31 formed on the cylinder wall. The pinion 29 engages the teeth of an internal gear 32, which is cut upon the inner wall of the inner annular valve 33. This valve is provided with a port opening 34 which registers with the ports or passages leading to the cylinders as clearly shown in Fig. 3, it being apparent to persons skilled in the art that the rotation of the valve brings the opening 34 in register with the ports leading to the interior of the two adjacent cylinders, and is fitted with piston rings 35 and 36 of the usual construction, one of which is located in a circumferential groove formed in the periphery of the annular valve, the other, 36, bearing against the external surface of the inner side of the annulus, is held in position by an annular member 37, which is secured in position by means of screws 38, or in any other convenient manner.

The annular valve is fitted to an annular chamber or recess formed in the side wall of the cylinders and is adapted to fit said chamber loosely, depending on the piston rings 35 and 36 to prevent the leakage of gas and the engagement of the annular member 39 with the edge of the valve 33. The structure thus far described is an operative one. My means of securing quick opening of the valves and closing of the ports will be next described.

The outer disk valve 24 is provided with a hollow flange 39, which is fitted to an annular recess 40 formed in the inner valve 33. The outer valve 24 is provided with a port opening 41 of the same size as the port opening 34 of the inner valve member.

I have described the construction for one side only of the engine, as it is apparent from an inspection of the drawings, that the construction is duplicated on the other side, the only difference being in the locating of the ports 34 and 41 which obviously must be placed so as to properly time the engine.

The operation of the device is as follows: The rotation of the crank serves to rotate the eccentrics 15 and 16 and these in turn impart a reciprocating motion to the eccentric rods 17 and 18, which cause the upper valve rod 21 to be rotated. It will be noted that the construction employed prevents this rod from ever being on a dead center. This rotation of the upper valve rod 21 serves to rotate the valve disk 24 in the same direction that the valve rod 21 is being rotated. It will be apparent that the gear 28 will be rotated with the shaft and will impart its motion to the pinion 29. This in turn will rotate the inner valve disk 33 through the medium of the teeth on the internal gear 32 with the result that the inner valve will move in an opposite direction to that in which the outer valve disk 24 is moving. This enables me to produce quick opening and closing of the valves.

It will be apparent that by duplicating this construction on the opposite side of the engine cylinders that a similar set of valves will operate the exhaust valves, the said valve being actuated by the same valve rod 21 which actuates the ones on the inlet side.

Although I have described eccentric rods and worm and gear for imparting rotation to the upper valve rod 21, it will be apparent to persons skilled in the art that many different forms of drive can be utilized for this purpose and I do not wish to be understood as limiting myself to the eccentrics for accomplishing this result. Changes may also be made in the construction of the valves and I desire to be understood as not limiting myself to the precise construction shown in the drawings, except as such limitations shall appear in the claims.

Having described my invention what I regard as new and desire to secure by Letters Patent is:

1. In a gas engine having a plurality of cylinders, a valve shaft passing between adjacent cylinders adjacent the explosion chamber, there being inlet and exhaust ports on opposite sides of the cylinders, disk valves secured to the ends of said shaft, annular valves intermediate the disk valves and the cylinders, means to rotate said annular and disk valves in opposite directions.

2. In a gas engine having a plurality of cylinders, a valve shaft passing between adjacent cylinders adjacent the explosion chamber, there being inlet and exhaust ports on opposite sides of the cylinders, disk valves secured to the ends of said shaft, annular valves intermediate the disk valves and the cylinders, piston rings which bear against the external surfaces of the inner valve, means to prevent the leakage past the annular valve and means to rotate said annular and disk valves in opposite directions.

3. In a gas engine having a plurality of cylinders, a valve shaft passing between adjacent cylinders adjacent the explosion chamber, there being inlet and exhaust ports on opposite sides of the cylinders, disk valves secured to the ends of said shaft, annular valves intermediate the disk valves and the cylinders, an internal gear cut upon the annular valves, pinions carried by said shaft adjacent said annular valves, an intermediate gear in mesh with the teeth of the internal gear and the pinion on the shaft, and means to rotate said valves and in turn said gears.

4. In a gas engine having a plurality of cylinders, a valve shaft passing between adjacent cylinders adjacent the explosion chamber, there being inlet and exhaust ports on opposite sides of the cylinders, disk valves secured to the ends of said shaft, annular valves intermediate the disk valves and the cylinders, an internal gear cut upon the annular valves, pinions carried by said shaft adjacent said annular valves, an intermediate gear in mesh with the teeth of the internal gear and the pinion on the shaft, means to rotate said valves and in turn said gears, cranks formed on said valve shaft, eccentric rods attached to said cranks, a shaft journaled in the side walls of the crank case, eccentric disks mounted thereon, and means to cause rotation of the crank shaft to rotate the shaft carrying the eccentrics.

5. In a gas engine having a plurality of cylinders, a valve shaft passing between adjacent cylinders adjacent the explosion chamber, there being inlet and exhaust ports on opposite sides of the cylinders, disk valves secured to the ends of said shaft, annular valves intermediate the disk valves and the cylinders, piston rings, which bear against the external surfaces of the inner valve, means to prevent the leakage past the annular valve, means to rotate said annular and disk valves in opposite directions, there being a recess in the cylinder walls in which said annular valves are mounted, and means to hold said annular valves within said recess.

6. In a gas engine having a plurality of cylinders, a valve shaft passing between adjacent cylinders adjacent the explosion chamber, there being inlet and exhaust ports on opposite sides of the cylinders, disk valves secured to the ends of said shaft, annular valves intermediate the disk valves and the cylinders, piston rings, which bear against the external surfaces of the inner valve, means to prevent the leakage past the annular valve, means to rotate said annular and disk valves in opposite directions, there being a recess in the cylinder walls in which said annular valves are mounted, means to hold said annular valves within said recess, and valve covers detachably secured to the side walls of the cylinders.

7. In a gas engine having a plurality of cylinders, a valve shaft passing between adjacent cylinders adjacent the explosion chamber, there being inlet and exhaust ports on opposite sides of the cylinders, disk valves secured to the ends of said shaft, annular valves intermediate the disk valves and the cylinders, piston rings, which bear against the external surfaces of the inner valve, means to prevent the leakage past the annular valve, and means to rotate said annular and disk valves in opposite directions, and journal bearings for said valve shaft.

In witness whereof, I have signed the foregoing specification.

RICHARD SCHMITZ.

Copies of this patent may be obtained for five cents each, by addressing the "Commissioner of Patents, Washington, D. C."